Figure 1:
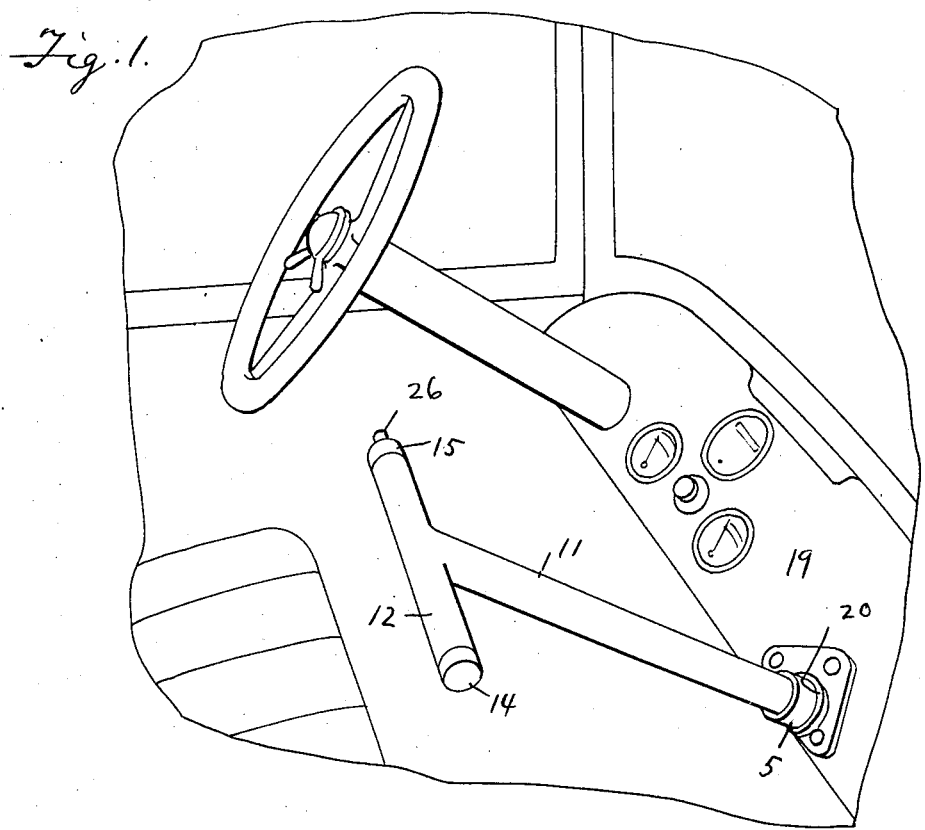

Feb. 25, 1930. M. PENTLAND 1,748,426
AUTOMOBILE SAFETY ATTACHMENT
Filed Oct. 10, 1927 2 Sheets-Sheet 1

Inventor

Moses Pentland.

By Clarence A. O'Brien
Attorney

Feb. 25, 1930.    M. PENTLAND    1,748,426
AUTOMOBILE SAFETY ATTACHMENT
Filed Oct. 10, 1927    2 Sheets-Sheet 2
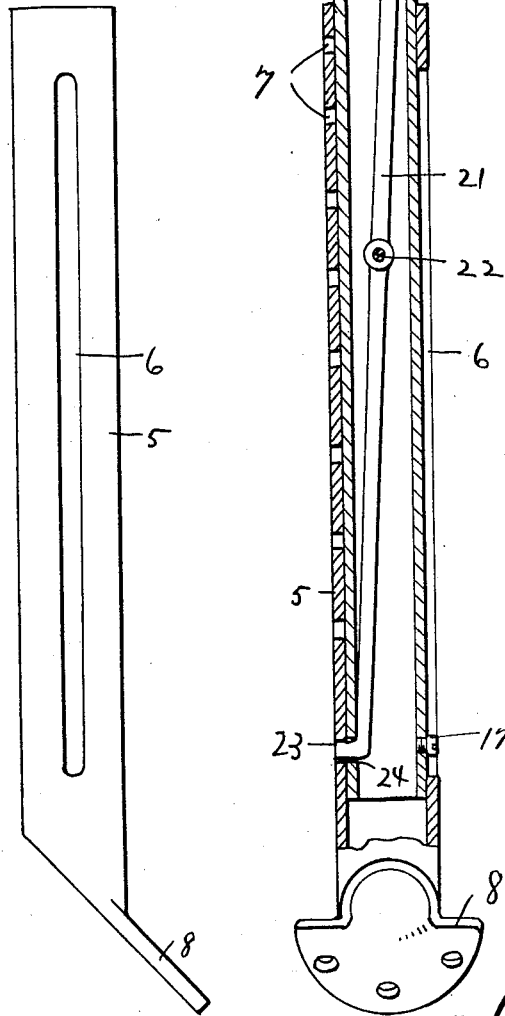

Patented Feb. 25, 1930

1,748,426

UNITED STATES PATENT OFFICE

MOSES PENTLAND, OF NEWBERRY, MICHIGAN

AUTOMOBILE SAFETY ATTACHMENT

Application filed October 10, 1927. Serial No. 225,140.

The present invention relates to an attachment for automobiles and has for its prime object to provide a device which is adjustable and projects in front of the passenger on the driver's seat of an automobile so that the passenger may hold thereon. When an automobile is traveling at a great rate of speed, it is very frequently necessary to bring the same to a quick stop which tends to throw the passenger forwardly toward the windshield, the driver however, is able to resist this because of the steering wheel. It is the purpose of this invention to provide a device which may be held onto by the passenger somewhat in the same manner that a driver holds onto the steering wheel when the automobile is being brought to a sudden stop.

Another very important object of the invention resides in the provision of a device of this nature which consists of a pair of telescopically associated sections so that the same may be adjusted to an out-of-the-way position and adjusted to a convenient position when desired.

A still further important object of the invention resides in the provision of an attachment of this nature which is exceedingly simple in its construction, easy to manipulate, strong and durable, thoroughly efficient and reliable in use, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 2:
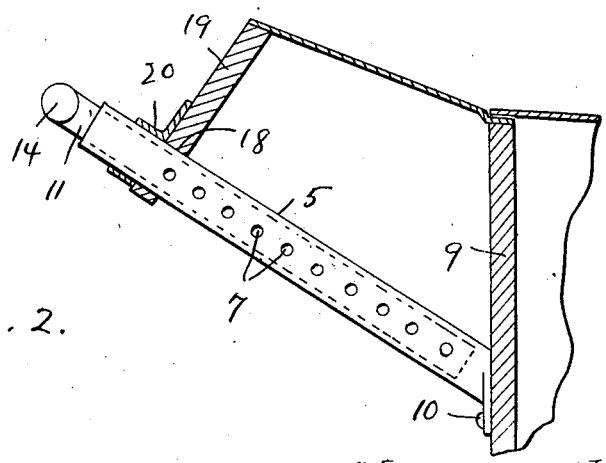

Figure 1 is a perspective view showing the front compartment of an automobile sufficiently to illustrate the location of my improved attachment, Figure 2 is a vertical longitudinal section through the dash-board and instrument board of an automobile with the attachment in place, Figure 3 is a sectional elevation of the attachment, and, Figure 4 is a side elevation of the fixed tubular member of the attachment.

Referring to the drawing in detail it will be seen that the numeral 5 denotes an elongated tubular member having on one side an elongated slot 6 and on the diametrically opposite side a series of spaced apertures 7. The bottom end of the tubular member 5 has a foot plate 8 formed integrally therewith so that the same may be fastened on the dashboard 9 of an automobile by means of screws 10 or in any other suitable manner. The numeral 11 denotes an elongated tubular member slidable or telescopically mounted in the tubular member 5 and having formed integrally with the upper end thereof a cross tubular head portion 12 closed at its ends by caps 14 and 15 which are threadedly engaged therewith or otherwise secured therewith. The cap 15 is provided with an opening 16. A screw 17 is engageable with the lower end of a tubular member 11 so that the head thereof moves in the slot 6 to prevent the tubular members from rotating in respect to each other but allowing the member 11 to be extended from the member 5 when desired. Thus the effective length of the device may be changed as will be convenient and desirable from time to time.

The upper portion of the tubular member 5 extends through an opening 18 in the instrument board 19 and also through a collar 20 secured thereon so that the tubular head portion 12 is located in front of the passenger portion of the front seat of the automobile.

A lever 21 is pivoted intermediate its ends in the tubular member 11 as at 22 and has one end offset as at 23 to project through an opening 24 opposite the screw 17 and through one of the openings 7 thereby holding the member 11 in adjusted relation with the member 5. The upper end of the lever 21 is pivotally engaged as at 25 with an intermediate portion of a rod 26 which is slidable through the opening 16 at one end while the other end extends through a coil spring 27 which has one end impinging against the cap 14 and the other end impinging against a pin 28 through the rod 26 so as to normally hold the lever diagonally of the tube 14 with the offset end 23 projecting through the opening 24 in one of the openings 7. Obviously by pushing on the extended end of the rod 26 adjacent the cap 15 the lever may be rocked to a releasing position so that one member may be adjusted in relation to the other.

With a device of this nature it will be seen that the passenger on a driver's seat when the automobile is traveling at a relatively great rate of speed and there is danger of being thrown through the windshield of the automobile by sudden stops, may pull upwardly on the head portion 12 to bring the same in a convenient position to hold on, this being accomplished first by releasing the locking lever 21 as heretofore indicated. It is apparent that this device may be used in the rear of the automobile or in other vehicles for the same purpose. I do not wish to be limited to the preferred use thereof described herein.

It is thought that the construction, operation, utility, and advantages of this invention will now be quite apparent to those skilled in this art without a more detailed description thereof. The present embodiment of the invention has been disclosed in detail merely by way of example since in actual practice it attains the features of advantage enumerated as dessirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

An attachment of the class described comprising a pair of tubular members telescopically associated, a lever pivotally mounted in the inner member and having an offset extension at one end, said offset extension projecting through an opening in the inner member and engageable with a series of openings provided longitudinally of the outer member, said inner member having a tubular head on the end thereof with a slidable rod therein, said lever being pivotally engaged with an intermediate portion of the rod, and spring means engaged with the rod holding one end projected from the head and the offset end engaged in the openings of the members.

In testimony whereof I affix my signature.

MOSES PENTLAND.